United States Patent [19]
Suzuki et al.

[11] Patent Number: 5,560,757
[45] Date of Patent: Oct. 1, 1996

[54] EXHAUST PARTICULATE FILTER FOR DIESEL ENGINE

[75] Inventors: Shougo Suzuki; Toshiaki Sakaguchi, both of Yamato, Japan

[73] Assignee: Isuzu Ceramics Research Institute Co., Ltd., Kanagawa-ken, Japan

[21] Appl. No.: 429,132

[22] Filed: Apr. 26, 1995

[30] Foreign Application Priority Data

Apr. 28, 1994 [JP] Japan .................. 6-114131

[51] Int. Cl.⁶ .................. B01D 29/62; B01D 35/18
[52] U.S. Cl. .................. 55/516; 55/523; 55/527; 55/DIG. 10; 55/DIG. 30
[58] Field of Search .................. 55/512, 516–519, 55/523, 525, 527, DIG. 10, DIG. 30, DIG. 43, DIG. 44

[56] References Cited

U.S. PATENT DOCUMENTS

| | | | |
|---|---|---|---|
| 2,821,261 | 1/1958 | Vixler et al. | 55/523 X |
| 3,499,269 | 3/1970 | Bois | 55/512 X |
| 3,960,509 | 6/1976 | Abriany | 55/512 X |
| 4,181,514 | 1/1980 | Lefkowitz et al. | 55/523 X |
| 4,255,173 | 3/1981 | Mayer et al. | 55/518 X |
| 4,424,248 | 1/1984 | Tesch et al. | 55/DIG. 43 |
| 4,576,799 | 3/1986 | Wörner et al. | 55/DIG. 30 |
| 4,732,594 | 3/1988 | Mizrah et al. | 55/523 |
| 4,761,323 | 8/1988 | Mühlratzer et al. | 55/512 X |
| 4,791,785 | 12/1988 | Hudson et al. | 55/DIG. 30 |
| 4,813,231 | 3/1989 | Bykowski | 55/523 X |
| 4,829,766 | 5/1989 | Henkel | 55/523 X |
| 5,171,341 | 12/1992 | Merry | 55/523 X |
| 5,228,891 | 7/1993 | Adiletta | 55/523 X |
| 5,248,481 | 9/1993 | Bloom et al. | 55/DIG. 30 |
| 5,248,482 | 9/1993 | Bloom | 55/DIG. 30 |
| 5,298,046 | 3/1994 | Peisert | 55/DIG. 30 |
| 5,454,845 | 10/1995 | Anahara et al. | 55/523 X |

*Primary Examiner*—Robert Spitzer
*Attorney, Agent, or Firm*—Staas & Halsey

[57] ABSTRACT

An exhaust particulate filter for a diesel engine which is high in collecting efficiency of exhaust particulates and small in pressure loss, by using a felt-like body having pores of an optimum inner diameter between heat resistant inorganic lengthy fibers. Wire nets (31) formed of heat resistant metal are put upon both upper and lower surfaces of felt-like body (32), which are arrested from both the surfaces thereof by heat resistant yarn (33), the felt-like body (32) being configured such that heat resistant inorganic lengthy fibers cut into a predetermined length are irregularly oriented in a horizontal direction and laminated, to which needles are applied, and the inorganic lengthy fibers are vertically entangled.

8 Claims, 3 Drawing Sheets

EXHAUST PARTICULATE FILTER FOR DIESEL ENGINE

INDUSTRIAL APPLICABILITY

The present invention relates to an exhaust particulate (finely-divided) filter for a diesel engine, and particularly to an exhaust particulate filter using heat resistant inorganic lengthy fibers.

PRIOR ART

Exhaust particulate filters for collecting exhaust finely-divided particulate, such as graphite, called "particulate" in exhausts from a diesel engine, known thus far, include a filter, using a porous honeycomb body formed of cordilite ceramics and silicon carbide, a filter, using a foam-like pore body of ceramics, and a filter using a woven fabric formed of inorganic fibers.

Reproducing methods of the exhaust particulate filter formed of ceramics include a method for igniting and burning the exhaust particulate collected on the surface by a flame of a burner, a method making use of combustion propagation, and a method for igniting and burning the particulates by electric heat. A further method comprises causing air flow against the exhaust flow in the exhaust particulate filter, removing the exhaust finely-divided particulates collected on the surface of the exhaust particulate filter, and thereafter burning the particulates.

The above-mentioned exhaust particulate filter formed of ceramics must have a relatively wide surface area corresponding to the exhaust flow rate of the diesel engine since pores formed in the surface on which the exhaust particulates are collected are smaller than the exhaust particulates. In the above-mentioned exhaust particulate filter, when the exhaust particulates are collected on the surface of the exhaust particulate filter, the pores of the exhaust particulate filter becomes smaller and smaller so that the exhaust particulates are accumulated on the surface of the exhaust particulate filter, and the pressure loss caused by the fluid resistance of the exhaust particulate filter abruptly increases. Further, in portions where the exhaust particulates are abnormally accumulated when the exhaust particulate filter is reproduced due to combustion, a combustion temperature is 1400° C., resulting in a breakage or melting of the exhaust particulate filter, Even if combustion temperature is below 1400°C., the combustion propagation is not uniformly performed, and the exhaust particulate filter sometimes cracks due to thermal stress.

Further, the exhaust particulate filter formed of inorganic fibers must have a wide surface area since the filter collects the exhaust particulates on the surface thereof.

In view of the above-mentioned problems, an object of the present invention is to provide an exhaust particulate filter for a diesel engine which is high in collecting efficiency of exhaust particulates and small in pressure loss, by using a felt-like body having pores of optimum size between heat resistant inorganic lengthy fibers.

For achieving the above-described object, the present invention provides an exhaust particulate filter for a diesel engine wherein wire nets, formed of heat resistant metal, are put upon both upper and lower surface of a felt-like body, which are arrested from both surfaces thereof by heat resistant yarn, said felt-like body being configured such that heat resistant inorganic lengthy fibers, cut into a predetermined length, are irregularly oriented in a horizontal direction and laminated, to which needles are applied and said inorganic lengthy fibers are vertically entangled.

The felt-like body having pores having an optimum inner diameter between the heat resistant inorganic lengthy fibers efficiently collects the exhaust particulates not only on the surface thereof but also on portions internally of the surface.

With respect to the heat resistant wire nets put upon both surfaces of the felt-like body, the wire nets are energized to thereby burn the collected exhaust particulates.

DESCRIPTION OF THE PREFERRED EMBODIMENT

Figure 1:
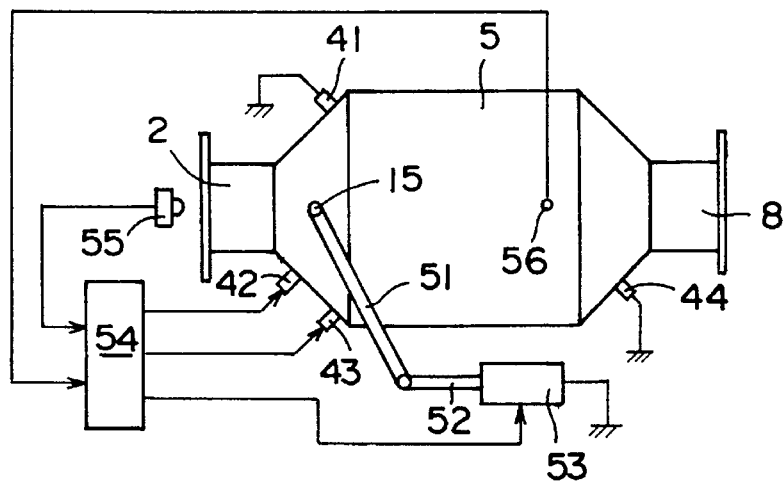
FIG. 1 is a side view showing a schematic configuration of an exhaust purifying apparatus for a diesel engine using an exhaust particulate filter according to the present invention.
Figure 2:
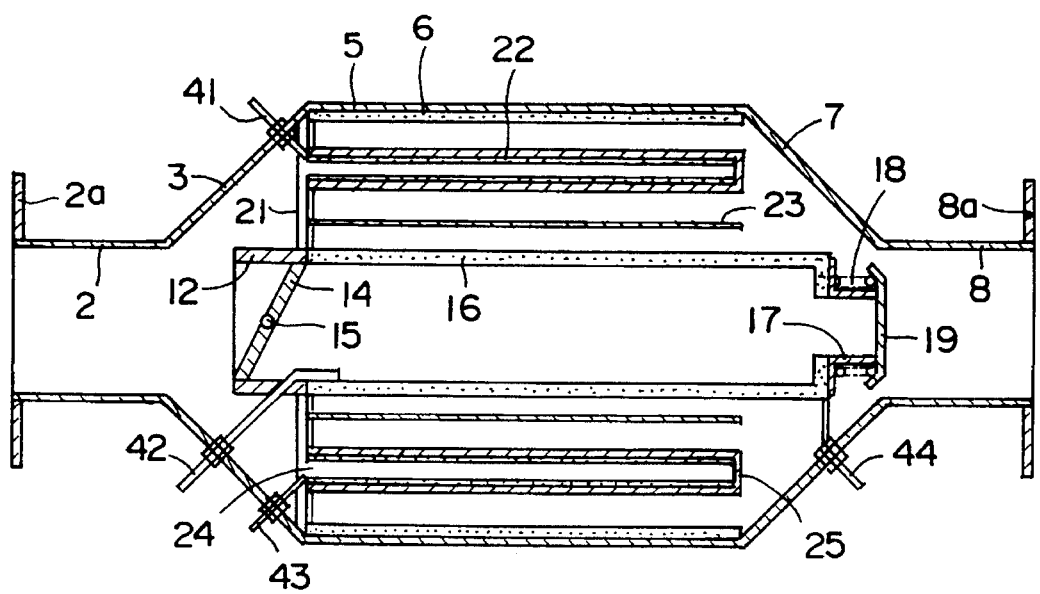
FIG. 2 is a sectional view inside of the exhaust purifying apparatus.

FIG. 1 is a side view showing a schematic configuration of an exhaust purifying apparatus of a diesel engine using an exhaust particulate filter according to the present invention; and FIG. 2 is a sectional view in side of the exhaust purifying apparatus. As shown in FIG. 2, the exhaust purifying apparatus comprises a thermal insulating material 6 attached to an inner peripheral surface of a tubular vessel 5, a tubular exhaust particulate filter 16 formed of porous metal (metal foam) disposed on the diametrically central part, a bulkhead tube 23 disposed on the outer peripheral side of the exhaust particulate filter 16, and a double-tube type exhaust particulate filter 22 formed of inorganic lengthy fibers disposed in an annular space between the vessel 5 and the bulkhead tube 23. Alternatively, the exhaust particulate filter 22 can be constructed such that a plurality of elongated cup-like elements are disposed at peripheral equal intervals in the annular space between the vessel 5 and the bulkhead tube 23. The exhaust particulate filter 16 and the bulkhead tube 23 are supported on an annular plate 21 disposed at an inlet end (a left end) of the vessel 5. The double-tube type exhaust particulate filter 22, right end wall 25 of which is closed is also supported in its left end by the annular plate 21, which is provided with a number of openings at peripheral equal intervals in communication with a left end inlet 24 of the exhaust particulate filter 22.

A tube 12 is connected to the exhaust particulate filter 16, and a butterfly bypass valve 14 is rotatably supported interiorly of the tube 12 by a support shaft 15. The support shaft 15 is extended externally, to which is connected a lever 51. As shown in FIG. 1, the lever 51 is connected to a plunger 52 of an electromagnetic actuator 53.

A tube 17 is connected to the end, downstream of the exhaust particulate filter 16, and a relief valve 19 formed from a disk for opening and closing the end of the tube 17 is pulled by the force of a spring 18 into contact with the end of the tube 17. The left end of the vessel 5 is connected to an inlet tube 2 through a conical tube 3, and the inlet tube 2 is connected in its flange 2a to the end upstream of an exhaust pipe. The right end of the vessel 5 is connected to an outlet tube 8 through a conical tube 7, and the outlet tube 8 is connected by its flange 8a to the end, downstream of the exhaust pipe, in communication with an exhaust muffler.

The conical tube 3 supports electrodes 41, 42 and 43 through insulators, and the conical tube 7 likewise supports an electrode 44. The electrodes 43 and 41 are caused to energize the wire nets put upon the inner surface of the exhaust particulate filter 22, and the electrodes 42 and 44 are caused to energize the wire nets put upon the inner surface of the exhaust particulate filter 16 to burn the exhaust particulates collected by the exhaust particulate filters 16 and 22 and reproduce the exhaust particulate filters 16 and 22.

In the above-mentioned exhaust particulate filter for a diesel engine, when the exhaust flow rate is less than a middle level, the bypass valve 14 is closed as shown in FIG. 2. The exhaust gas enters into the double-tubular exhaust particulate filter 22, via the conical tube 3, from the inlet pipe 2, and is filtered when the exhaust gas passes through the exhaust particulate filter 22 diametrically inward or diametrically outward. The filtered exhaust gas flows into the exhaust muffler, via the conical tube 7 and the outlet tube 8.

When the exhaust flow rate is in excess of a middle level, the electromagnetic actuator 53 is excited by an output of an electrocontroller 54 on the basis of a signal from a sensor 55 for detecting the exhaust flow rate. The plunger 52 of the electromagnetic actuator 53 extends leftward, and the bypass valve 14 rotates clockwise about the support shaft 25 and opens. At this time, the half of the exhaust flow rate passes through the exhaust particulate filter 22 and flows into the outlet tube 8 via the conical tube 7 as previously mentioned. When the remaining portion of the exhaust gas flow rate passes the exhaust particulate filter 16 diametrically outward, the particulates contained therein are filtered. The filtered exhaust gas flows into the outlet tube 8 via the bulkhead tube 23 and the conical tube 7. When the exhaust flow rate is less than a middle level, the electromagnetic actuator 53 is deenergized, and the plunger 52 moves rightward so that the bypass valve 14 is closed.

When exhaust pressure in the exhaust particulate filter 16 rises due to the clogging of the exhaust particulate filter 16, the relief valve 19 is opened against the force of the spring 18 to prevent the exhaust particulate filters 16 and 22 from being damaged. At this time, a part of the exhaust gas directly flows into the outlet tube 8 from the interior of the exhaust particulate filter 16. When the exhaust pressure in the exhaust particulate filters 16 and 22 rises, the electrodes 43 and 41 are energized by the output of the electrocontroller 54 on the basis of a signal from a sensor 56 for detecting the exhaust pressure in the exhaust particulate filters 16 and 22.

That is, there is formed an energization circuit from a power supply, the electrode 43, the wire net of the exhaust particulate filter 22, the electrode 41, to the power supply. When the wire net is heated, the exhaust particulates such as graphite collected on the surface of the exhaust particulate filter 22 are burnt, and the exhaust particulate filter 22 is reproduced. At the same time, there is formed an energization circuit from a power supply, the electrode 42, the wire net of the exhaust particulate filter 16, the electrode 44, to the power supply. When the wire net is heated, the exhaust particulates such as graphite collected on the surface of the exhaust particulate filter 16 are burnt, and the exhaust particulate filter 16 is reproduced. When the exhaust pressure in the exhaust particulate filter 16 is below a predetermined value, the relief valve 19 receives the force of the spring 18 and closes, and the energization to the exhaust particulate filters 22 and 16 are cut off.

Figure 3:
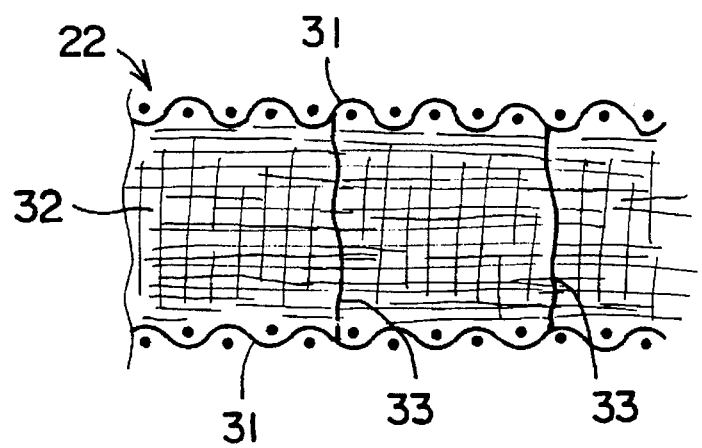
FIG. 3 is a sectional view inside of the exhaust particulate filter in the exhaust purifying apparatus.

As shown in FIG. 3, according to the present invention, for the purpose of improving the collecting efficiency of the exhaust particulates of the exhaust particulate filters 22 and 16, particularly, the exhaust particulate filter 22 used in the entire running area of the engine, the exhaust particulate filter 22 is constructed such that energizing wire nets 31 are put upon both surfaces of a felt-like body 32 formed of heat resistant inorganic lengthy fibers, which are arrested by yarn 33. The inorganic lengthy fibers are formed of Si—Ti—C—O ceramics, Si—C—O ceramics, Si—N ceramics or Si—O ceramics and metal, and the surface of the inorganic lengthy fibers is coated with silicon carbide, aluminum or alumina. Metals which constitute the wire net 31 used, include nickel, nickel alloy, tungsten, tungsten alloy, Fe—Cr—Al alloy and/or Fe—Cr—Al—Y alloy.

In the fabrication of the felt-like body 32, the inorganic lengthy fibers are irregularly oriented horizontally by a carding machine, laminated and entangled each other, and then the fibers are applied needles so as to vertically entangle (thicknesswise) the inorganic lengthy fibers. Adequate outside diameter of the inorganic lengthy fibers is 8 to 15 μm, and length thereof is 30 to 100 mm. If the inorganic lengthy fibers are laminated in the thickness of 2 to 10 mm and then applied with needles at intervals of about 4 mm, elongated complicated pores enough to arrest the exhaust particulates having 98 to 96.5% of the pressure loss of the exhaust particulate filter ratio of voids are formed between the inorganic lengthy fibers. When the inorganic lengthy fibers are shorter than a predetermined dimension, poor entangling occurs, whereas when too long, the fibers are difficult to be irregularly oriented horizontally. Adequate spacing of needle-application is about 4 mm and can be adjusted according to the thickness of lamination of the inorganic lengthy fibers. When the thickness of the felt-like body 32 is less than 2 mm, the exhaust particulates pass through stopping, whereas when the thickness thereof exceeds 10 mm, the ratio of voids decrease, the collecting efficiency lowers, and the reproducing time becomes long.

EXAMPLE

Inorganic lengthy fibers (Product name: Tyrano fibers) formed of elements of silicon, titanium, carbon, and oxygen having an outside diameter of 8.5 μm, are cut into a length of 50 mm, and the thus cut inorganic lengthy fibers are irregularly oriented horizontally by a carding machine, entangled and laminated, so as to have a uniform thickness. Subsequently, needles are applied vertically (thicknesswise) at intervals of 4 mm, and the inorganic lengthy fibers are drawn up from the back and from an intermediate layer to form a felt-like body. 35-mesh wire nets formed of Fe-Cr-Al-Y alloy and then put upon both surfaces of the felt-like body, formed of the inorganic lengthy fibers, to form a double-tubular exhaust particulate filter. Many felt-like bodies were fabricated whose amount of needling, "Metsuke", caused by the application of needles, are 100, 150, 200, 250 and 300 g/m2, thickness is 3 mm, and ratio of voids are 98.7 to 95.7%.

Figure 4:
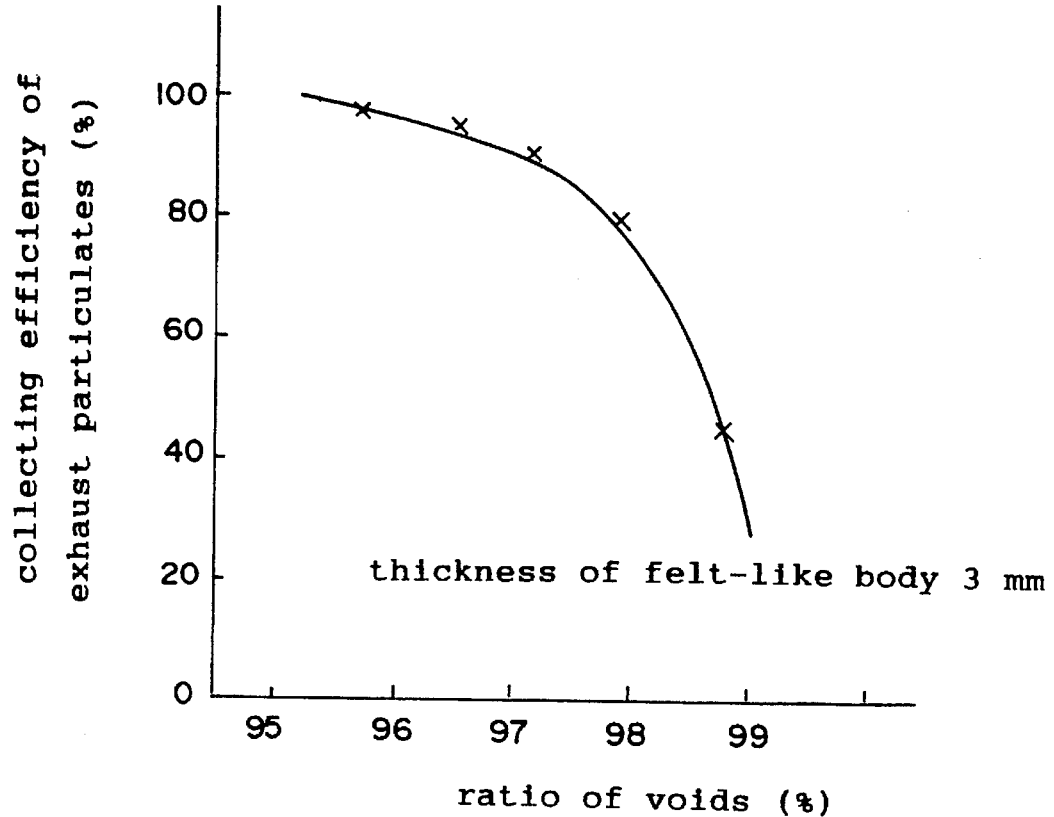
FIG. 4 is a diagram representative of characteristics of the exhaust particulate filter.
Figure 5:
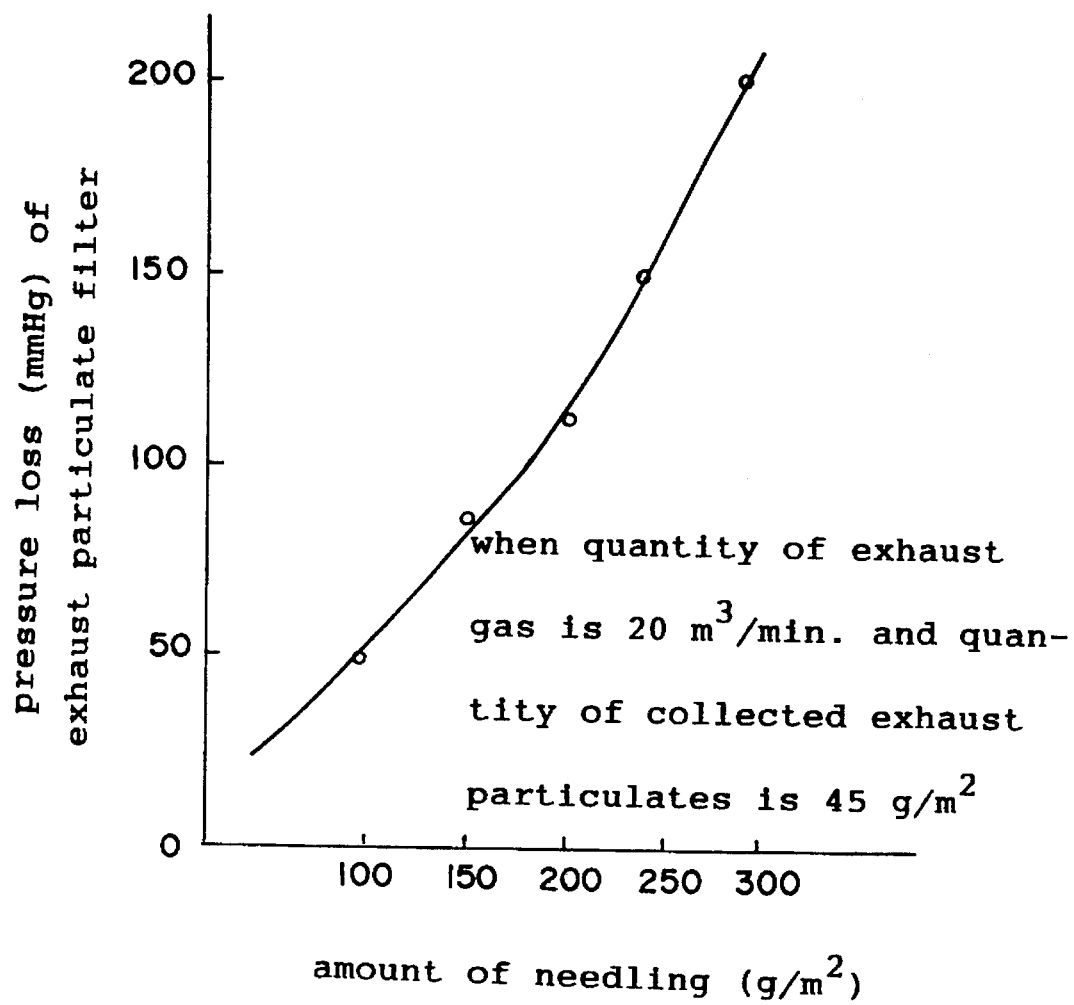
FIG. 5 is a diagram representative of characteristics of the exhaust particulate filter.

FIGS. 4 and 5 show the characteristics of the felt-like bodies. When the ratio of voids of the exhaust particulate filter rise, the collecting efficiency of the exhaust particulates lowers. When the amount of needling caused by application of needles increases, the pressure loss of the exhaust particulate filter also increases. It is desired that the presently allowable pressure loss of the exhaust particulate filter in a diesel engine is about 150 mmHg, and the collecting efficiency of the exhaust particulates is 50% or more. However, since the felt-like body formed of inorganic lengthy fibers according to the present invention is high in the ratio of voids, less pressure loss occurred, and the collecting efficiency of the exhaust particulates was about 90%. The reason why is that a dense portion of fibers and a coarse portion of fibers are present, in mixed form, in the felt-like body formed of the inorganic lengthy fibers, and large exhaust particulates are collected in the coarse portion of fibers, close to the surface, and small particulates are collected in the dense portion of fibers internally of the surface.

According to the observation of the mode of the exhaust finely divided particulates collected, the exhaust particulates are collected even in the portion internally of the whole surface of the exhaust particulate filter, which is different from the conventional honeycomb type in which the exhaust particulates are collected only at the surface. Since the exhaust particulates can be collected not only from the surface, but also from the interior, the surface area of the exhaust particulate filter can be made approximately ⅓ as narrow as that of the conventional honeycomb type.

The aforementioned exhaust particulate filter was used to repeatedly collect the exhaust particulates, and the reproduction thereof was carried out. As a result, even in repeated (500 times) tests, the reproduction with complete combustion of exhaust particulates was obtained, no pressure loss occurred, and 90% of collecting efficiency of the exhaust particulates was maintained. This was excellent as compared with 50% of the collecting efficiency obtained by conventional exhaust particulate filters.

The present invention provides an exhaust particulate filter for a diesel engine in which wire nets, formed of heat resistant metal, are put upon both upper and lower surfaces of a felt-like body, which are arrested from both surfaces thereof by heat resistant yarn, said felt-like body being configured such that heat resistant inorganic lengthy fibers cut into a predetermined length are irregularly oriented in a horizontal direction and laminated, to which needles are applied and said inorganic lengthy fibers are vertically entangled. Therefore, the particulates are collected not only from the surface but from the interior of the felt-like body formed of the inorganic lengthy fibers, whereby the collecting efficiency of the exhaust particulates is high and the pressure loss is small.

What is claimed is:

1. An exhaust particle filter comprising:
   a felt body having first and second surfaces, formed of heat resistant inorganic lengthy fibers, irregularly oriented horizontally by a carding machine, laminated, and entangled, and vertically entangled by needling;
   a first wire net attached to said first surface, and a second wire net attached to said second surface,
   wherein at least one wire net has energizable electrode terminals attached to opposite ends thereof.

2. The exhaust particle filter according to claim 1, said inorganic lengthy fibers having an outside diameter of from 8 to 15 μm and having a length of from 30 to 100 mm.

3. The exhaust particulate filter according to claim 1, said felt body having a thickness of from 2 to 10 mm and having a ratio of voids of from 98.7 to 95.7%.

4. The exhaust particulate filter of claim 1, wherein said inorganic lengthy fibers are formed of Si—Ti—C—O ceramics, Si—C—O ceramics, Si—N ceramics, Si—O ceramics, or metal, and are coated with silicon carbide, aluminum or alumina.

5. The exhaust particulate filter of claim 1, having a spacing between said first wire net and said second wire net of from 2 to 10 mm.

6. The exhaust particulate filter of claim 1, wherein said felt body is three-dimensionally entangled by carding before being vertically entangled by needling.

7. The exhaust particulate filter of claim 1, wherein said energizable electrode terminals energize said at least one wire net to burn collected exhaust particulates in response to an output from a sensor for detecting exhaust pressure in said exhaust particulate filter.

8. An exhaust particulate filter comprising:
   a felt body having first and second surfaces, formed of heat resistant inorganic lengthy fibers, irregularly oriented horizontally by a carding machine, laminated, and entangled, and vertically entangled by needling;
   a first wire net attached to said first surface and a second wire net attached to said second surface by heat resistant yarn;
   said inorganic lengthy fibers having a predetermined length.

* * * * *